(12) United States Patent
Wystup et al.

(10) Patent No.: US 8,319,461 B2
(45) Date of Patent: Nov. 27, 2012

(54) METHOD AND CONTROL SYSTEM FOR CONTROLLING A BRUSHLESS ELECTRIC MOTOR

(75) Inventors: Ralph Wystup, Künzelsau (DE); Helmut Lipp, Dörzbach-Hohebach (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 331 days.

(21) Appl. No.: 12/834,124

(22) Filed: Jul. 12, 2010

(65) Prior Publication Data

US 2011/0025237 A1    Feb. 3, 2011

(30) Foreign Application Priority Data

Jul. 17, 2009   (EP) ..................................... 09165817

(51) Int. Cl.
*H02P 21/00*   (2006.01)
(52) U.S. Cl. ...................... 318/400.2; 318/599; 318/801; 318/805
(58) Field of Classification Search .............. 318/400.02, 318/805, 807, 599, 801
See application file for complete search history.

(56) References Cited

U.S. PATENT DOCUMENTS

| 4,763,058 | A | * | 8/1988 | Heining et al. | 318/807 |
|---|---|---|---|---|---|
| 5,850,132 | A | * | 12/1998 | Garces | 318/599 |
| 6,014,007 | A | * | 1/2000 | Seibel et al. | 318/805 |
| 7,834,579 | B2 | * | 11/2010 | Nojima | 318/801 |
| 7,843,162 | B2 | * | 11/2010 | Bae et al. | 318/801 |
| 2009/0230900 | A1 | * | 9/2009 | Bae et al. | 318/400.02 |
| 2011/0025237 | A1 | * | 2/2011 | Wystup et al. | 318/400.02 |

FOREIGN PATENT DOCUMENTS

| EP | 2 034 605 A | 3/2009 |
|---|---|---|
| EP | 2 034 695 A | 3/2009 |
| JP | 10 136634 A | 5/1998 |
| JP | 10 248300 | 9/1998 |
| JP | 2002 051589 A | 2/2002 |

OTHER PUBLICATIONS

European Search Report—Sep. 9, 2009.

* cited by examiner

*Primary Examiner* — Paul Ip
(74) *Attorney, Agent, or Firm* — Brinks Hofer Gilson & Lione

(57) ABSTRACT

The present invention relates to a method and a system for controlling a permanent magnet excited, brushless, electronically commutated, three-phase electric motor (2) wherein a single-phase main AC voltage ($U_N$) having a mains frequency ($f_N$) is rectified and supplied to an inverter (8) via a slender intermediate circuit (6) containing no, or minimum, intermediate circuit reactance as intermediate circuit voltage ($U_z$) pulsating at double the mains frequency ($2f_N$) which is actuated for powering and commutating the electric motor (2). Control takes place by means of a field-oriented current-space vector regulator, wherein a q-current ($i_q$) as torque-forming component of the current-space vector (i) is regulated perpendicularly to the permanent magnetic field and a d-current ($i_d$) can be regulated as a field-influencing component of the current-space vector (i) in the direction of the permanent magnet field. In this case, dynamic field attenuation occurs, wherein the d-current ($i_d$) in the negative range is defined with a sinusoidal profile and at double the main frequency ($2f_N$) and wherein the d-current ($i_d$) is regulated according to its phase position and its amplitude such that ripple of the q-current ($i_q$) is minimized. Since the q-current as torque forming component is proportional to the torque, thus the torque ripple is also minimized, in spite of the strongly pulsating intermediate circuit voltage ($U_z$).

6 Claims, 2 Drawing Sheets

METHOD AND CONTROL SYSTEM FOR CONTROLLING A BRUSHLESS ELECTRIC MOTOR

CROSS REFERENCE TO RELATED APPLICATION

This application claims priority to European Patent Application No. EP 09165817.9, filed Jul. 17, 2009.

FIELD OF THE INVENTION

The present invention primarily relates to a method for controlling a permanent magnet excited, brushless, electronically commutated, in particular a three-phase electric motor wherein a single-phase, mains AC voltage having a supply or main frequency is rectified and supplied to an inverter via a slender intermediate circuit containing a minimum or no intermediate circuit reactance as intermediate circuit voltage pulsating at twice the main frequency, the inverter being actuated for powering and commutating the electric motor, wherein the actuation is carried out by means of a field-oriented current-space vector regulator (vector control), wherein a q-current as torque-forming component of the current-space vector is regulated perpendicularly to the permanent magnetic field and a d-current can be regulated as field-influencing component of the current-space vector in the direction of the permanent magnet field.

Furthermore, the invention also relates to a corresponding control system, in particular applying the method according to the present invention, with a main rectifier, an outlet-connected, slender intermediate circuit, without or with only minimum intermediate circuit reactance and also with an inverter powered via the intermediate circuit and controllable for commutating the electric motor with means for field-oriented current-space vector control with a speed controller to define a q-current as the torque-forming component of the current-space vector.

BACKGROUND OF THE INVENTION

Electronically commutated motors, so-called EC motors, are frequently used as fan drives. These drive units generally consist of a permanent magnet excited synchronous motor (PMSM) with integrated power and signal electronics which frequently are external rotor motors.

Electric motors of this kind can be operated from a single-phase or three-phase AC voltage by first rectifying the AC voltage to an intermediate circuit voltage, which is then converted via a controlled inverter into a motor operating voltage to power and commutate the motor. As a rule, the inverter is controlled by a field-oriented current-space vector regulator, wherein a q-current as the torque-forming component of the current-space vector is regulated perpendicularly to the permanent magnet field in order to achieve a maximum torque. A d-current is controllable in the direction of the permanent magnet field and forms a field-influencing, i.e. field-forming or field-attenuating depending on the direction of the current, component of the current-space vector. In synchronous motors, the d-current is usually regulated to zero in order to reach optimum efficiency.

In order to achieve a motor torque with minimum ripple (ripple of the air gap torque, i.e. of the internal motor moment) as most uniform and constant as possible and thereby a favorable noise behavior (especially in fan drives), the intermediate circuit voltage should preferably be a constant DC voltage. In order to achieve this, the DC voltage rectified via a main rectifier and highly pulsating, has so far been smoothed via at least one smoothing capacitor and if necessary, via an additional filter choke. For this purpose, the smoothing capacitor actually has to have a relatively large capacitance (e.g. several hundred µF) so that standard electrolyte capacitors (Elkos) can be used. But in practical usage, the latter have several disadvantages, and specifically in particular a large installation volume and a short service life.

There is today therefore, an increasing tendency to either avoid the smoothing capacitors entirely, or at least to avoid the electrolyte capacitors, and, in the latter case, to use longer lasting foil capacitors with reduced capacitance (only up to several µF) are used. Owing to the absent, or only minimum intermediate circuit reactances, the term "slender intermediate circuit" has been used, wherein decoupling of the main and motor side by means of storage components, such as capacitors and chokes (reactances), is wholly or at least largely omitted. This means that a slender intermediate circuit contains no, or only minimum, intermediate circuit reactance.

With this technology of the "slender intermediate circuit" particular problems chiefly occur in the main single-phase power supply from the single-phase mains (standard main AC supply frequency e.g. 50 or 60 Hz), because the rectified DC voltage pulsates very strongly at twice the main frequency (e.g. 100 Hz or 120 Hz) between zero and a peak value, wherein the voltage profile corresponds to the value of the sinusoidal mains AC voltage. If an EC motor (PMSM) were now to be powered directly from such a highly pulsating DC voltage, only an insufficient motor current could be applied below a certain threshold voltage to the motor windings which would no longer be able to maintain the required torque constant.

It is the object of the present invention to optimize the operation of an electronically commutated electric motor (EC motor) with "slender intermediate circuit" in a technically favorable manner and with simple and cost-effective means.

According to the present invention, this object is attained by a method according to this invention. A suitable control system for applying the method is also described. Advantageous embodiments of the invention are presented in the following description.

According to the present invention, a dynamic field attenuation thus takes place by defining the d-current in the negative range with a sinusoidal profile and double main frequency, and without measuring the main and/or intermediate circuit voltage, and wherein the d-current is regulated according to its phase position (relative to the mains frequency) and its amplitude depending on the q-current such that a ripple of the q-current is minimized. Since the q-current as the torque-forming component is proportional to the torque, the torque ripple (ripple of the air gap torque=internal motor torque) is thus also minimized, and specifically in spite of the intermediate circuit voltage pulsating very strongly between zero and a peak value.

The invention is based on the fact that the d-current should ideally be dynamically regulated in such a manner that the current-space vector in the fixed-rotor coordinate system is always tracked so that the length of the voltage-space vector (corresponding to the amplitudes of the phase voltages) is always as long in the fixed-rotor coordinate system as is currently possible from the pulsating intermediate circuit voltage (tracking of the phase voltage). For this purpose, however, an exact solution of a differential equation and a corresponding technical implementation would be required. The present invention, however, attains that due to the d-current which is variable in time, the phase voltage is tracked on the basis of the time course of the intermediate circuit voltage, so that the resulting motor phase voltages can still be generated at sufficiently good approximation from the strongly pulsating intermediate circuit voltage. A negative d-current causes a field attenuation, which results in that the motor can be operated at a lower terminal voltage and thus a lower intermediate circuit voltage and still, at a then higher power consumption, produce its rated power (rated torque, rated speed). Therefore, despite the pulsating intermediate circuit voltage and even at small voltage values below the defined limiting voltage, the motor can be kept running at nearly constant torque due to the field attenuation. In addition, due to the dynamic field attenuation, a dynamic power storage occurs in the existing motor inductances and a resulting energy feedback into the intermediate circuit (namely advantageously without operating the motor by means of the generator which changes the torque) as well as a phase power smoothing. It virtually is a "boost converter effect," as a result of which the intermediate circuit voltage is additionally increased and the torque ripple further reduced.

It should additionally be mentioned that a voltage-space vector with a maximum of half the length of the intermediate circuit voltage can always be generated from the instantaneous intermediate circuit voltage. The amplitudes of the three phase voltages in the fixed-stator coordinate system thus correspond to the length of the voltage-space vector in the fixed-rotor coordinate system. The phase voltages are formed from the intermediate circuit voltage on the basis of the voltage-space vector via transformation by means of pulse width modulation (PWM). Thus the maximum possible amplitude of the phase voltages corresponds to half the intermediate circuit voltage.

A large motor inductance promotes the voltage feedback via the d-current modulation. Likewise, it contributes to smoothing the motor currents and thus to keeping the torque constant. The reason for this is that the dynamic field attenuation allows operating the motor up to a minimum phase voltage and thus intermediate circuit voltage without collapse of the torque. The feedback of energy via the d-current modulation indeed increases the intermediate circuit voltage (boost converter effect), but not always up to the minimum voltage that can be achieved by field attenuation. The remaining voltage difference thus results in that the phase current briefly collapses (pulses) causing torque fluctuations. A large motor inductance, which has to be present anyway due to the large voltage drop caused by dynamic field attenuation, smoothes the pulsating current profile, just as any inductance smoothes out a current profile (energy storage), and ensures that the power flux can be kept nearly constant. From the approach of the differential equation, which leads to an exact solution of the d-current profile as a function of the intermediate circuit voltage, it follows that due to the dynamic field attenuation, the phase voltage and thus, as described, the intermediate circuit voltage can be reduced more than would be possible (at the same $i_d$-current peak value) by constant field attenuation, since the differential voltage drops are included in the phase voltage due to the rate of change of the d-current.

The torque-forming q-current is held constant independently of the d-current or defined by a speed controller when the inverter is actuated. This means that the dynamic field attenuation changing the d-current has no effect on the q-current, except for the ripple reduction, or on the respectively adjusted motor speed. Due to variation of the d-current, only the length and angle of the current-space vector resulting from the mutually perpendicular components changes.

A control system according to the present invention in the first instance consists of the standard components for EC control, namely a main rectifier and a downstream inverter connected via an intermediate circuit which is actuated to generate quasi-sinusoidal motor currents for corresponding voltage clocking (modulation) of a PWM control. For this purpose, means are provided for field-oriented current-space vector regulation with a speed controller to specify a q-current as the torque-forming component of the current-space vector. According to the present invention, the control system has a function generator to specify a dynamically changing d-current with a sinusoidal profile and a double the main frequency as current component for dynamic field attenuation and in addition, a two-dimensional extreme-value regulator which regulates the sinusoidal d-current according to its phase position and amplitude as a function of the q-current in such a manner that ripple of the q-current is minimized. The additional components of the control system, and specifically the function generator and the extreme value regulator, can be implemented in a relatively simple technical and cost-effective manner.

BRIEF DESCRIPTION OF THE DRAWINGS

The invention will hereinafter be explained in greater detail with reference to the drawings. The drawings show.

DETAILED DESCRIPTION OF THE INVENTION

Figure 1:
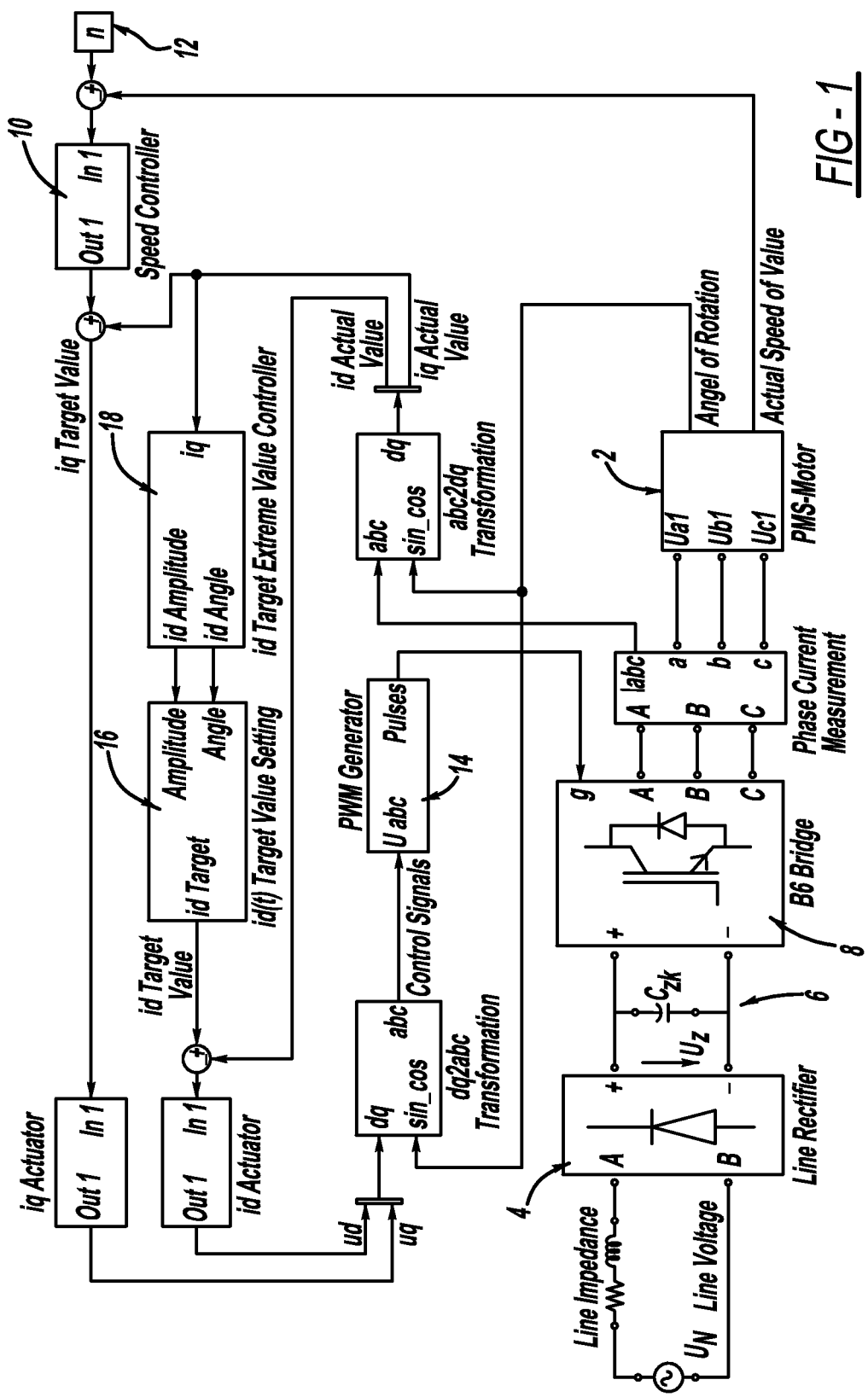
FIG. 1 is a simplified block diagram of a control system according to the present invention as the preferred exemplary embodiment.
Figure 2:
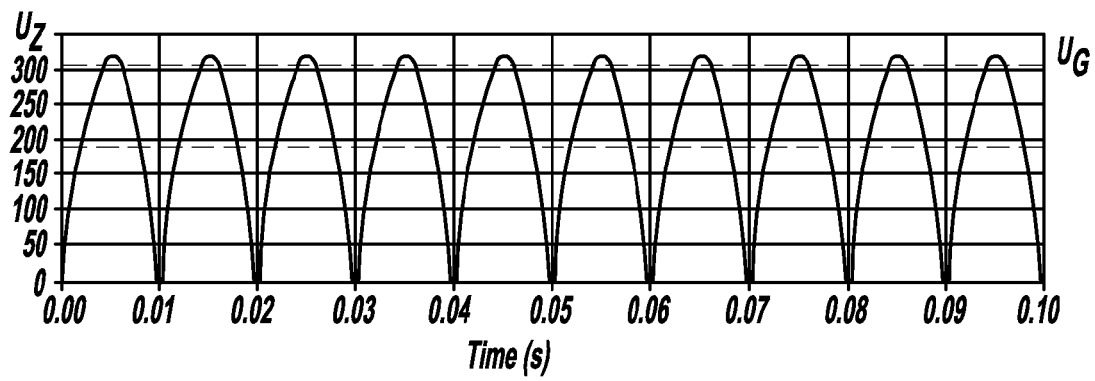
FIG. 2 is a voltage diagram as additional exemplification.

As is apparent from FIG. 1, a control system according to the present invention for controlling a collector-less, permanent magnet electronically commutated (EC) synchronous electric motor 2 consists of a supply or main rectifier 4, an downstream slender intermediate circuit 6 which contains no or only a minimum intermediate circuit reactance as well as an inverter 8 which is powered via the intermediate circuit 6 and can be applied for commutating the electric motor 2. By means of the main rectifier 4, which is illustrated in a simplified manner but designed as a full bridge, a single-phase mains AC voltage $U_N$ at a supply or main frequency $f_N$ is rectified into a strongly pulsating intermediate circuit voltage U. This intermediate circuit voltage $U_z$ is illustrated in FIG. 2; it pulsates at twice the main frequency $2f_N$ between zero and a peak value. The voltage profile corresponds to the value of the sinusoidal main AC voltage $U_N$.

According to FIG. 1, the intermediate circuit 6 contains, if necessary, an intermediate circuit capacitor $C_{zk}$ with low capacitance. This can be a small and cost-effective foil capacitor. This intermediate circuit capacitor $C_{zk}$ is, however, not sufficient for smoothing the intermediate circuit voltage $U_z$, so that it strongly pulsates anyway (see FIG. 2).

The inverter 8 is a power end stage made of a bridge circuit (three-phase full bridge) with six electronic switches which are not shown in detail in FIG. 1.

The electric motor 2 illustrated in a highly simplified manner as a block in FIG. 2, contains three winding strands, especially in star connection, which are powered by the inverter 8 in order to generate a rotating field in the known manner. For this purpose, the control system operates with a standard field-oriented current-space vector regulator (vector regulation).

Figure 3:
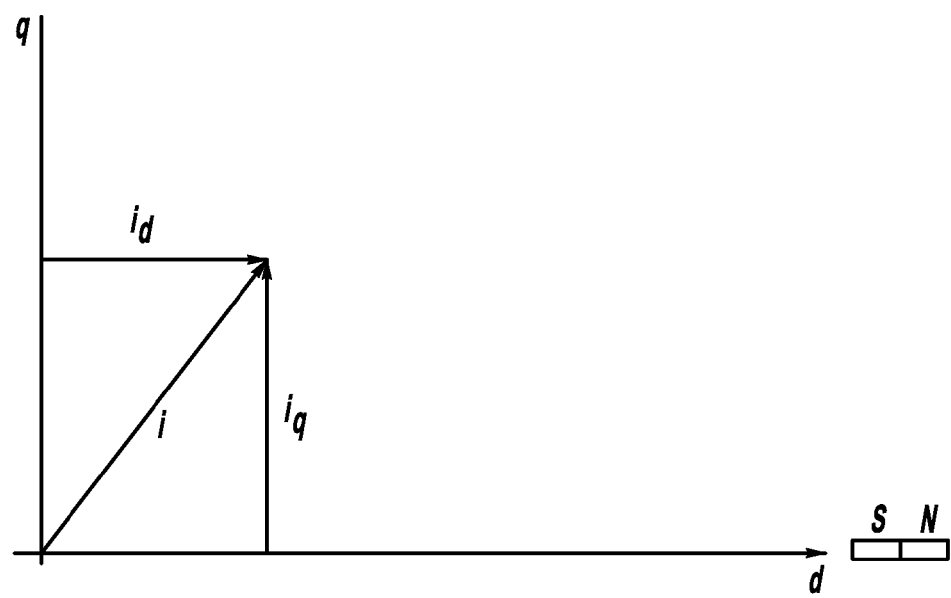
FIG. 3 is a current-space vector diagram in the fixed-rotor Cartesian coordinate system.

In this respect, reference is made to the diagram in FIG. 3. It is an illustration in the fixed-rotor Cartesian coordinate system. The horizontal axis d represents the alignment of the permanent magnetic field (cf. the exemplary magnet drawn with its poles S and N). One axis q runs perpendicular to this. An exemplary current-space vector i is shown, which results from two current components, specifically a q-current $i_q$, which is regulated as the torque-forming component perpendicularly to the permanent magnet field (d-axis), and a d-current $i_d$, which is regulated as the magnetic field-influencing component in the direction of the magnetic field, so that it forms no torque. In synchronous motors, the d-current is usually regulated to zero in order to reach maximum torque from the q-current at optimum efficiency. The resulting current-space vector i with the minimum value then corresponds to the q-current $i_q$.

The torque-forming q-current $i_q$ is held constant, but preferably is defined and regulated via a speed controller 10. To adjust and/or to specify a particular rotational speed n, any particular type of servo-element 12 is used. The inverter 8 is actuated via a PWM generator 14 as a function of the rotational angle of the rotor of the electric motor 2.

If the electric motor 2 was now powered directly by the strong pulsating, due to the slender intermediate circuit 6, intermediate circuit voltage $U_z$ according to FIG. 2, then only insufficient motor current would be applied to the motor windings below a particular limit voltage $U_G$ so that it would no longer be able to keep the required torque constant.

According to the present invention, therefore, the control system operates with a novel dynamic field attenuation, wherein the d-current $i_d$ is defined in the negative range by a sinusoidal profile and double main frequency $2f_N$. Thus, the d-current specified as a set value is regulated according to its phase position relative to the main AC voltage $U_N$ and according to its amplitude, in such a manner that ripple of the q-current $i_q$ is minimized. The sequence of these regulation steps is fundamentally arbitrary (phase position in the first place and amplitude in the second place, or vice-versa). As a result of the modulated d-current $i_d$, the resulting phase current has an amplitude phase modulation.

According to FIG. 1, the control system according to present the invention has a function generator 16 for defining a dynamically changing d-current $i_d$ with a sinusoidal profile and with double the main frequency as current component for dynamic field attenuation. In connection with the function generator 16, a two-dimensional, extreme value regulator 18 is additionally provided which is designed so that it regulates the sinusoidal d-current $i_d$ according to its phase position and amplitude as a function of the monitored q-current $i_q$, in such a manner that a ripple of the q-current is minimized. Thus, the resulting motor phase voltage tracks the course of the pulsating intermediate circuit voltage $U_z$ with sufficient accuracy.

Due to the dynamic field attenuation according to the present invention and the related processes within the control system, and in particular due to the dynamic change in the d-current, the additional effect of dynamic energy storage in the existing motor inductances is advantageously achieved.

This stored energy is fed back into the intermediate circuit 6 so that the intermediate circuit voltage $U_z$ is increased. Consequently, it is a boost converter effect. This also has a favorable effect on the ripple reduction of the q-current and thus also on the torque ripple. Smoothing the phase current by the motor inductance likewise acts as energy storage in that the motor inductance for the feedback via the d-current and for smoothing the phase current is to be viewed as energy storage which can advantageously be handled independently of the torque formation.

The dynamic field attenuation according to the present invention works particularly well in motors which have a large phase inductance in order to allow a large voltage drop of the phase voltage on the one hand, and also to smooth out the phase current (deep pass behavior) on the other hand.

The method also works particularly well in motors whose frequency of the phase current (phase frequency) is smaller than the frequency of the pulsating intermediate circuit voltage (as described, a certain residual ripple can remain). The resultant, higher frequency current collapses can be filtered by the deep pass behavior of the winding, which stabilizes (smoothes) the current profile and thus the torque.

The method according to the present invention can also be used in combination with a boost converter provided in the intermediate circuit 6, the boost converter increasing and thus smoothing the intermediate circuit voltage with respect to its momentary values, at least up to a critical limiting voltage. For this purpose, stray inductances of the motor winding heads can be used particularly advantageously as inductance for the boost converter mode. A corresponding method is the subject matter of the older European patent application EP 09163651, to which full reference is made and which is incorporated by reference to this specification.

The invention is not limited to the illustrated and described exemplary embodiments, but also comprises all embodiments having equal function within the context of the invention.

While the above description constitutes the preferred embodiment of the present invention, it will be appreciated that the invention is susceptible to modification, variation, and change without departing from the proper scope and fair meaning of the accompanying claims.

The invention claimed is:

1. A method for controlling a permanent magnet excited, brushless, electronically commutated, three-phase electric motor (2) comprising the steps of providing a single-phase main AC voltage ($U_N$) having a main frequency ($f_N$) is rectified and supplied to an inverter (8) via a slender intermediate circuit (6) containing no or a minimum intermediate circuit reactance as an intermediate circuit voltage ($U_z$) pulsating at double the main frequency ($2f_N$) which is supplied for powering and commutating the electric motor (2), wherein the supply takes place by means of a field-oriented current-space vector regulator, wherein a q-current ($i_q$) as a torque-forming component of the current-space vector (i) is regulated perpendicularly to the field of the permanent magnet and a d-current ($i_d$) can be regulated as a field-influencing component of the current-space vector (i) in the direction of the field of the permanent magnet, a dynamic field attenuation, wherein the d-current ($i_d$) in the negative range is defined with a sinusoidal profile and at double the main frequency ($2f_N$) and wherein the d-current ($i_d$) is regulated according to its phase position and its amplitude such that ripple of the q-current ($i_q$) is minimized.

2. The method according to claim 1, further comprising in that, the q-current ($i_q$) is defined by a speed controller (10) independently of the d-current ($i_d$).

3. A method according to claim 1, further comprising in that, dynamic energy storage in existing motor inductances of the motor due to the dynamic field attenuation and thus an energy feedback into the intermediate circuit (6) as well as phase current smoothing occurs.

4. A method according to claim 1, further comprising by its application for the motor (2) of a type with a large phase inductance, or for the motor (2) of a type whose phase frequency is smaller than the pulse frequency of the intermediate circuit voltage ($U_z$).

5. A control system for a brushless, electronically commutated, three-phase electric motor (2), comprising a main rectifier (4), a downstream slender intermediate circuit (6), without, or with only minimum, intermediate circuit reactance as well as having an inverter (8) that can be actuated via the intermediate circuit (6) and controllable for commutating the electric motor (2) having means for a field-oriented current-space vector control with a speed controller (10) to define a q-current ($i_q$) as torque forming component of the current-space vector (i), a function generator (16) to specify a dynamically changing d-current ($i_d$) with a sinusoidal profile in the negative range, and a double main frequency ($2f_N$) as current component for dynamic field attenuation as well as by an extreme value controller (18) which regulates the d-current ($i_d$) according to the phase position and amplitude depending on the q-current ($i_q$), in such a manner that ripple of the q-current ($i_q$) is minimized.

6. The control system according to claim 5, further comprising in that, the electric motor (2) is configured as synchronous external rotor motor.

\* \* \* \* \*